United States Patent
Kim et al.

(10) Patent No.: US 11,788,356 B2
(45) Date of Patent: Oct. 17, 2023

(54) OPTIMIZED ADHESIVE THICKNESS FOR METAL-TO-ELASTOMER BONDING IN OILFIELD MUD MOTOR AND PUMP STATORS

(71) Applicant: Halliburton Energy Services, Inc., Houston, TX (US)

(72) Inventors: Byong Jun Kim, Houston, TX (US); Reece Goldsberry, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 72 days.

(21) Appl. No.: 17/456,253

(22) Filed: Nov. 23, 2021

(65) Prior Publication Data

US 2023/0160261 A1  May 25, 2023

(51) Int. Cl.
| | |
|---|---|
| E21B 4/02 | (2006.01) |
| E21B 33/10 | (2006.01) |
| B29C 65/48 | (2006.01) |
| F04C 2/107 | (2006.01) |
| C08K 5/00 | (2006.01) |

(52) U.S. Cl.
CPC ............. *E21B 4/02* (2013.01); *B29C 65/48* (2013.01); *E21B 33/10* (2013.01); *C08K 5/0016* (2013.01); *F04C 2/1075* (2013.01); *F05C 2225/02* (2013.01)

(58) Field of Classification Search
CPC . E21B 4/02; E21B 33/10; B29C 65/48; F04C 2/1075; F05C 225/02
See application file for complete search history.

(56) References Cited

U.S. PATENT DOCUMENTS

| | | | |
|---|---|---|---|
| 6,905,319 B2 | 6/2005 | Guo | |
| 7,192,260 B2 | 3/2007 | Lievestro et al. | |
| 9,540,545 B2 | 1/2017 | Ramier et al. | |
| 9,540,933 B2 | 1/2017 | Morris | |
| 10,309,395 B2 * | 6/2019 | Ramier | F04C 2/1071 |
| 2011/0116961 A1 * | 5/2011 | Akbari | F04C 13/008 418/48 |
| 2013/0098429 A1 * | 4/2013 | Funayama | H02S 20/23 136/251 |

(Continued)

FOREIGN PATENT DOCUMENTS

| | | |
|---|---|---|
| CN | 110107222 A | 8/2019 |
| JP | 2015143458 A | 8/2015 |

OTHER PUBLICATIONS

International Search Report and Written Opinion dated Jan. 18, 2023 for corresponding PCT Patent Application No. PCT/US2022/077460 filed on Oct. 3, 2022.

*Primary Examiner* — Abby J Flynn
*Assistant Examiner* — Nicholas D Wlodarski
(74) *Attorney, Agent, or Firm* — K&L Gates LLP

(57) ABSTRACT

A downhole motor or pump assembly that includes a housing that includes a metal. A stator that includes an elastomer compound with an uncured plasticizer is secured and sealed within the housing using an adhesive system that includes an adhesive and a dried film thickness of 2.5 mil to 7 mil. The assembly also includes a rotor rotatable within the stator. The motor or pump is operable by rotation of the rotor within the stator. In the case of a motor assembly, the motor assembly may be part of a drilling assembly that includes a drillstring and a drill bit to drill a borehole.

15 Claims, 3 Drawing Sheets

(56) References Cited

U.S. PATENT DOCUMENTS

| | | |
|---|---|---|
| 2015/0233373 A1 | 8/2015 | Sicilian |
| 2020/0224655 A1* | 7/2020 | Bohmer .................. C08K 5/12 |
| 2020/0230845 A1 | 7/2020 | Guo et al. |
| 2021/0171724 A1 | 6/2021 | Butuc et al. |

* cited by examiner

OPTIMIZED ADHESIVE THICKNESS FOR METAL-TO-ELASTOMER BONDING IN OILFIELD MUD MOTOR AND PUMP STATORS

BACKGROUND

Positive Displacement Motors (PDMs), also known as Moineau-type motors, and Progressive Cavity Pumps (PCPs) include a rotor that rotates within an elastomer helicoid stator and can be used in borehole drilling applications. The helicoid shaped stator is made with an elastomer compound that is bonded within a metal housing. Pressurized drilling fluid (e.g., drilling mud) is driven into the motor and into a cavity between the rotor and the stator, which generates rotation of the rotor and a resulting torque is produced. The resulting torque is used to drive a working tool, such as a drill bit, to cut material such as when drilling a borehole.

To form a stator in a metal housing for PDM and PCP stators, an adhesive system is first applied by brushing or spraying a solvent- or water-based primer and/or adhesive onto inner surface of the metal housing tube after gritblasting and cleaning the metal surface to be bonded. The adhesive system for PDM and PCM is either one- (adhesive only) or two-component (primer and adhesive) systems. Primer and adhesive contain about 50-90% of solvent or even water for some of water-based adhesives. Content of solvent and water is essential for effective spraying or brushing of adhesive/primer onto inner metal surface. Without enough solvent in primers and adhesives, one cannot spray or brush adhesives effectively and uniformly onto the metallic substrate. Once the wet adhesive and/or primer is applied onto metallic substrate, solvents are typically evaporated at the room temperature within several hours before molding and curing of elastomer. After all solvents are evaporated from the metal substrate, stator manufacturers should measure the dried film thickness before elastomer molding to ensure that the dry film thickness is within the range of adhesive manufacturer's recommendation for the best adhesion outcome.

To form the stator, an elastomer is injected and molded inside an adhesive applied-metal tubular housing. Some of specially formulated stator elastomers may contain high amounts of combined plasticizers (including tackifier, process aid, and viscosity reducer), e.g., more than 10 phr. Mixing single or multiple plasticizing chemicals with PDM and PCP stator elastomers reduces the viscosity of the uncured compound for the stator injection process. If the uncured elastomer viscosity is too high, the elastomer is not able to be injected sufficiently into the 10 to 30 feet long housing through shallow flow channels. Plasticizers in the elastomer formulation are used to lower the viscosity of the stator elastomer so that the stator elastomer can flow effectively and fill in the stators during manufacturing process.

The adhesive used to form the bond must withstand an operational temperature and chemical environment. Unlike other industrial products requiring elastomer-to-metal adhesion, PDM and PCP stators are directly exposed to and/or fully immersed in drilling muds, completion fluids, acidizing fluids, produced hydrocarbons/brines, etc. Downhole temperature is typically 100° F. (311K) to 400° F. (478K). With considering internal hysteresis (heat buildup added to elastomer) during operation, the internal elastomer temperature could reach up to 600° F. (589K) temporarily. The exposure time varies from a few days for PDM stator and even a few years for PCP stator. Operating conditions beyond the temperature and chemical environment required may lead to the breakdown of the bond causing the stator elastomer to detach from the metal housing. In many cases, elastomer-to-metal debonding is a root cause of PDM and PCP failure in the different operation environments. Over the service time, adhesion between the elastomer stator and the outer metal housing may deteriorate in hot fluids and often lead to stator failure.

Therefore, it is desired for the elastomer-to-metal bond in the stator be reliable for oilfield stators used in drilling and pumping. The bonded parts of two dissimilar materials require a special adhesive (bonding agent) and delicately optimized technique between the elastomer and the metal substrate.

BRIEF DESCRIPTION OF THE DRAWINGS

Embodiments of the drilling assembly with downhole motor or pump are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
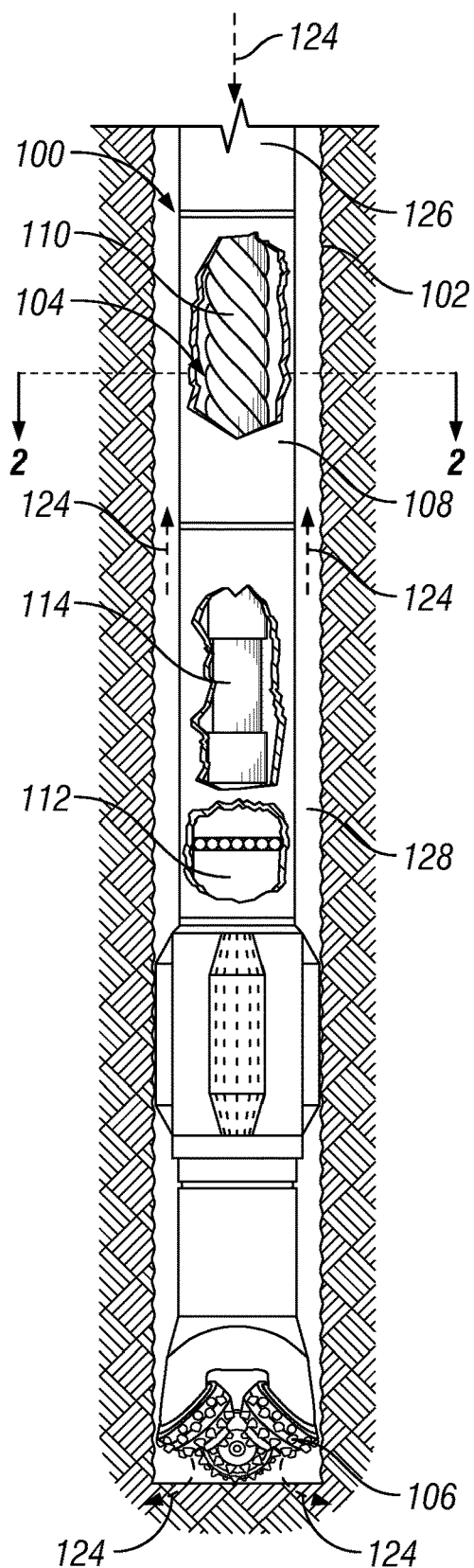
FIG. 1 is a drilling system disposed in a borehole, according to one or more embodiments.

The present disclosure describes an assembly with downhole motor or pump that includes an elastomeric stator bonded to the inside of an outer metal housing. This disclosure addresses the optimized adhesive system thickness for application of PDM and PCP stators for downhole stator elastomers for a robust adhesion retention of PDM and PCP stators to outer metal housings in harsh downhole operation conditions.

Manufacturers recommend a dried film thickness of any adhesive to achieve the highest bonding strength and reliable integrity of adhesion between an elastomer stator and an outer metal housing. The total combined dry film thickness recommended by each manufacturer is typically 0.5 mil (12.7 µm) to 1.5 mil (38.1 µm). No manufacturers recommend applying the combined dried film thickness greater than 1.5 mil (38.1 µm) for a one-component adhesive system that just includes adhesive and 2 mil (50.8 µm) for a two-component adhesive system that includes the adhesive and a primer. However, the conventional dry film thickness of commercial adhesives has not always offered good reliability of elastomer to metal bonding for oilfield PDM and PCP stators, especially with an elastomer containing excessive amount of plasticizers, process aids, tackifiers, and/or viscosity modifiers. Over continuous and multiple uses of the stators, it has been found in the oilfield industry that the adhesion strength may weaken and lead to the failure of PDMs and PCPs. In high temperature wells, such failure may be more frequent when the stators are exposed to aggressive drilling fluids. Also, a PCP stator that requires longer service than PDM stator tends to have de-bonding failure.

As an example, elastomer stators containing more than 10 phr of plasticizer (DINP=Diisononyl Phthalate, TOTM=Triethylhexyl trimellitate, Process aid-Proaid®, etc.) were tested and showed metal-to-adhesive de-bonding failure after aging in the same conditions as elastomer stators containing less than 10 phr of plasticizer. These stator samples were prepared with an adhesive system total dry film thickness of 1-2 mil (25.4-50.8 µm) as adhesive manufacturers recommend and PDM/PCP stator manufactures strictly comply to this recommendation.

One cause of poor bonding retention for the stators manufactured with conventional adhesive thickness (typically below 2 mil (50.8 µm) as a total combined thickness) is due to migration of uncured plasticizer into the adhesion interface between the stator and the outer housing. The migrating plasticizer from the elastomer compound of the stator to the adhesive interface diffuses and penetrates through a thin adhesive system layer and contaminates the metal surface during operation. As a result, metal-to-adhesive de-bonding failure between the metal housing and the stator elastomer may occur. In addition, migration of plasticizers is much easier and faster in the oilfield environment because the elastomer is fully exposed to hot drilling fluids or hydrocarbons continuously for a long period of time. The rate of migration of plasticizer may depend on many factors such as: chemical structure of plasticizer, process aid, tackifier, and viscosity reducer, total amount of plasticizer, process aid, tackifier, viscosity reducer in elastomer compound, other ingredients affecting chemical interaction in elastomer formulation, downhole fluid type (oil-based mud type, water-based mud type, brine type, produced hydrocarbon, etc.), and downhole temperature.

The term plasticizer in this disclosure includes any chemicals used in elastomers for the purpose of improving elastomer flowability during the elastomer injection. Therefore, the term plasticizer in this disclosure includes any form of liquids and resins as reinforcing fillers, reinforcing resins, curatives, plasticizers, process-aides, tackifiers, or viscosity reducers. For example, plasticizers used in NBR and HNBR compounds may include ester-based plasticizers such as adipates, sebacates, phthalates, trimellitates, and epoxidized soybean oil (ESO) and any combination thereof but are not limited to these. For example, process aids include stearamide, ester, and metal salts-based surface lubricants that can be mixed in elastomers, but are not limited to these. For example, tackifiers include synthetic low molecular weight polymer based, phenol based, hydrocarbon based, dicylopentadiene based, rosin resin based, terpene resin based (pine trees, D-Limonene (citrus) based, but is not limited to these.

The technical problem of robustly adhering an elastomeric stator with plasticizers is solved by the technical solution of an optimal but unconventional adhesive thickness range that can be implemented for a robust bonding retention for oilfield PDM and PCP stators. The disclosed adhesive system thickness might not be effectively applicable for the industrial products other than PDM and PCP stators because the proposed thickness is 3-10 times thicker than the recommended thickness by each of adhesive manufacturer.

A downhole motor or pump in accordance with this disclosure includes an outer metal housing and an elastomer secured and sealed within the housing using an adhesive system. The elastomer may be any suitable downhole elastomer, such as for example nitrile rubber or acrylonitrile butadiene rubber (NBR), acrylonitrile butadiene isoprene rubber (NBIR), carboxylated Nitrile Rubber (XNBR), hydrogenated acrylonitrile butadiene rubber (HNBR), or Fluoro-elastomers (FKM).

The adhesive system may include any suitable downhole adhesive system including an adhesive and optionally also a primer. Many elastomer-to-metal adhesives are commercially available in a wide variety of forms to meet the needs of the end user. Both one- (adhesive) and two-component (primer and adhesive) systems can be used, and they are available under the following categories: solvent based, low-HAPs (Hazardous Air Pollutant), environmentally preferred, and aqueous (water-based).

The adhesive system includes a combined dried film thickness of greater than 2.5 mil (64 µm) and up to 7 mil (178 µm), regardless of one-component or two-component adhesive systems. This optimized adhesive system thickness is for stator elastomers that include at least some liquid plasticizer in the cured (vulcanized) elastomer after vulcanizing process. Such an elastomer may include, for example, at least 10 phr (parts per hundred rubber) and up to 30 phr of any plasticizers in the elastomer formulation. For example, NBR, NBIR, or HNBR-based PDM and PCP stators may typically contain 15 to 30 phr of plasticizers in order to make elastomer injection process possible by lowering its viscosity of the uncured elastomer.

In conventional adhesive systems, such a thick layer of an adhesive system has not been recommended or ever used for metal-to-elastomer bonding. The adhesive system can be brittle and therefore a thicker layer of applied adhesive was thought to cause adhesive cracking failure. Therefore, typical combined adhesive system thickness of prior commercial products has been much less than 2.0 mil (50.8 µm), including any primer. However, the stators manufactured with conventional adhesive thickness are not able to retain enough bonding strength after the exposure in the same aging conditions and there is potential for bonding failure to occur during operation. In contrast, stators with the disclosed unconventionally optimized adhesive system thickness retain superior bonding strength. The disclosure offers that advantage of stators that can be used for drilling and pumping for longer periods of time and even at hotter down hole temperatures, e.g., 350° F. (450K) to 400° F. (478K).

Increasing the combined dried film thickness of the adhesive system up to 7 mil (178 µm) produces a more robust bond between the elastomer stator and the metal housing. In addition to a more robust bond, the optimized dried film thickness may also allow the development or use of elastomers thought unsatisfactory for downhole PDM and PCP use, because of the decreased or elimination of issues related to high temperature de-bonding. In many cases, options of new elastomer formulations must be significantly limited not to compromise metal-to-elastomer bonding. The thicker adhesive system combined dried film thickness allows elastomer chemists to have more options in their developing elastomer recipes in selecting raw polymers, plasticizers, process aids, tackifier, reinforcing fillers, etc.

As an example of a downhole motor, a main borehole may in some instances be formed in a substantially vertical orientation relative to a surface of the well, and a lateral borehole may in some instances be formed in a substantially horizontal orientation relative to the surface of the well. However, reference herein to either the main borehole or the lateral borehole is not meant to imply any orientation, and the orientation of each of these boreholes may include portions that are vertical, non-vertical, horizontal or nonhorizontal. Further, the term "uphole" refers a direction that is towards the surface of the well, while the term "downhole" refers a direction that is away from the surface of the well.

Figure 2:
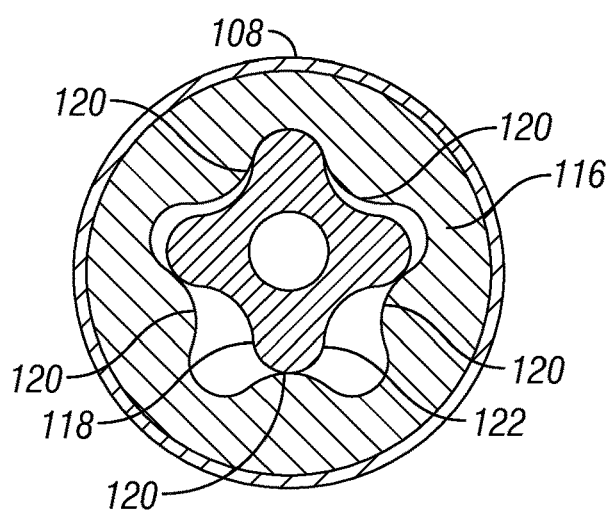
FIG. 2 is a cross-sectional view of the stator and rotor of FIG. 1.

FIGS. 1 and 2 are a broken side view and a cross section view of a drilling system 100 disposed in a borehole 102 and that includes a downhole motor 104 connected to a drill bit 106. The downhole motor 104 includes an outer metal tubular housing 108 that encloses a power unit 110. The power unit 110 is connected to a bearing section assembly 112 via a transmission unit 114 and includes an elastomeric stator 116 and a rotor 118. The elastomeric stator 116 is secured and sealed within the metal housing 108 using an adhesive system as described above that includes a combined dried film thickness of at least 2.5 mil (64 μm) and up to 7 mil (177.8 μm) thick.

Referring to FIG. 2, the stator 116 includes multiple (e.g., five) lobes 120 extending along the stator 116 in a helical configuration and defining a cavity 122. The rotor 118 also includes lobes extending along the rotor 118 in a helical configuration. The stator 116 and rotor 118 can also have more or fewer lobes where the difference between the rotor and stator lobes is one extra stator lobe for the number of rotor lobes. The rotor 118 is operatively positioned in the cavity 122 such that the rotor lobes cooperate with the stator lobes 120 in that applying fluid pressure to the cavity 122 by flowing fluid within the cavity 122 causes the rotor 118 to rotate within the stator 116. For example, referring to FIGS. 1 and 2, pressurized drilling fluid (e.g., drilling mud) 124 can be introduced at an upper end of the power unit 110 and forced down through the cavity 122. As a result of the pressurized drilling fluid 124 flowing through the cavity 122, the rotor 118 rotates, which causes the drill bit 106 to rotate and cut away material from the formation. From the cavity 122, the drilling fluid 124 is expelled at the lower end and then subsequently exhausted from the drill bit 106.

During a drilling operation, the drilling fluid 124 is pumped down the interior of a drill string 126 (shown broken away) attached to downhole motor 104. The drilling fluid 124 enters cavity 122 having a pressure that is a combination of pressure imposed on the drilling fluid by pumps (e.g., pumps at the surface) and the hydrostatic pressure of the above column of drilling fluid 124. The pressurized drilling fluid entering cavity 122, in cooperation with the lobes 120 of the stator 116 and the geometry of the stator 116 and the rotor 118 causes the rotor 118 to turn to allow the drilling fluid 124 to pass through the motor 104, thus rotating the rotor 118 relative to the stator 116. The drilling fluid 124 subsequently exits through ports (e.g., jets) in the drill bit 106 and travels upward through an annulus 128 between the drill string 126 and the borehole 102 and is received at the surface where it is captured and pumped down the drill string 126 again.

It is appreciated by those skilled in the art in addition to a drilling system that uses a PDP, a downhole assembly using an outer metal housing and an elastomer stator as described above may also be used as a PCP in a completion system for pumping downhole fluids to the surface.

Figure 3:
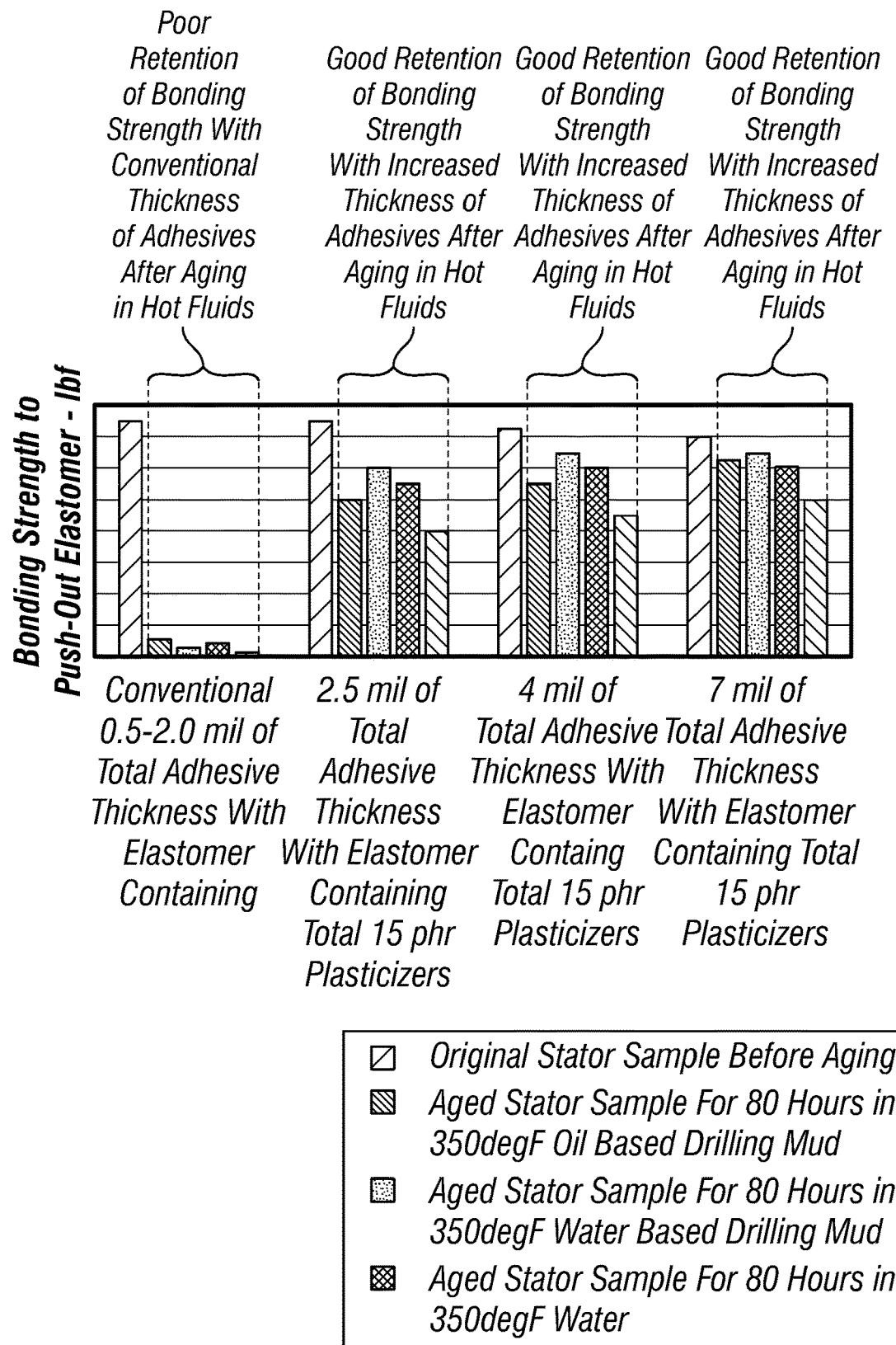
FIG. 3 shows graphical test results of different stators under different conditions.

As shown in FIG. 3, example laboratory stator pushout bonding tests were conducted for five different 1 inch (2.54 cm) wide stator sections having a 4.75 inch (12 cm) diameter that were prepared by open-end injection molding using different adhesive systems. For the laboratory test purpose, an actual PDM stator was cut into 1 inch (2.54 cm) wide section to evaluate the bonding strength of each adhesive system. For each of the adhesive systems, the first stator section was not aged under any controlled conditions, the second stator section was aged for 80 hours in 350° F. (450K) oil-based drilling fluid, the third stator section was aged for 80 hours in 350° F. (450K) water-based drilling fluid; the fourth stator section was aged for 80 hours in 350° F. (450K) water, and the fifth stator section was aged for 80 hours in 375° F. (464K) process oil. The aging was conducted at 500 psi (3.4 MPa). As shown in FIG. 3, the bonding strength of any of the sample stator sections with an adhesive system of 2.5 mil (64 μm) up to 7 mil (178 μm) increase at least 400% from the same stator section samples under the same conditions using adhesive systems with conventional thicknesses of 0.5 mil (12.7 μm) to 2.0 mil (50.8 μm). Further, the bonding strength of the stator samples having 2.5 mil (64 μm) up to 7 mil (178 μm) of total adhesive system thickness was not significantly compromised after aggressive aging in the various drilling fluids at 350° F. (450K) and 375° F. (464K) for 80 hours.

Figure 4:
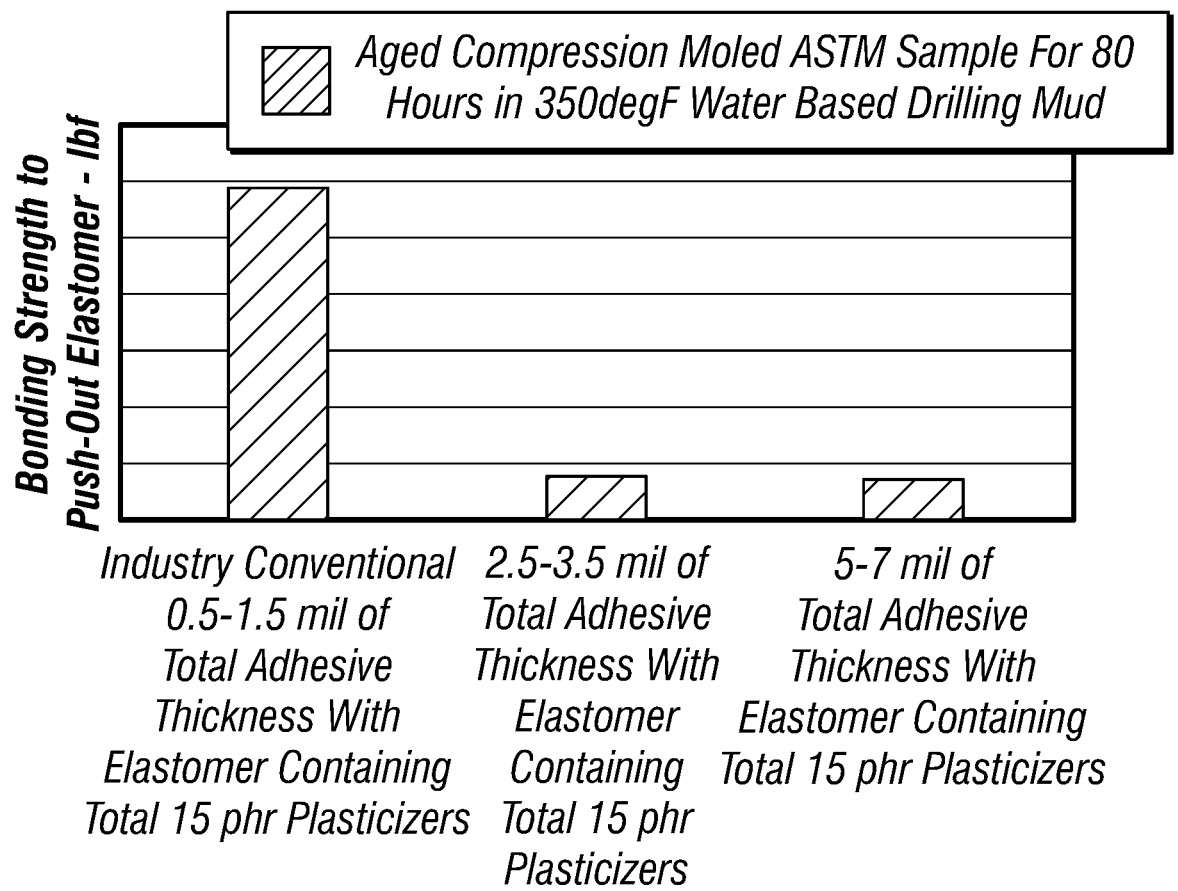
FIG. 4 shows graphical test results of different compression molded elastomers.

This finding is unusual in that high adhesive thickness is not always beneficial in other industrial products that were manufactured by compression molding or closed cavity injection molding as shown in FIG. 4. As shown in FIG. 4, exemplary ASTM D429 laboratory adhesion tests were conducted three different stator sections prepare by compression molding using different adhesive system thicknesses. In FIG. 4, the rubber-to-metal bonded ASTM D429-B specimens were prepared by compression molding while PDM and PCP stators have to be manufactured only by open-end injection. Typical rubber-to-metal bonded products are manufactured by compression molding and closed cavity injection molding. This means that a significant of force is applied on the adhesive layer during rubber molding by machine. Therefore, molecular chains between elastomer and adhesive polymers can be effectively entangled together even with a thin layer of adhesive by high machine force. Such intermolecular entanglement can be achieved by high pressure molding before curing. If the adhesive thickness is unnecessarily thicker than adhesive manufacturer's recommendation, a thick layer of brittle adhesive may crack by itself during the testing or during high force molding. FIG. 4 demonstrates the undesirable outcome of thick adhesive application greater than 2.5 mil (64 μm) for the compression molded products.

However, PDM and PCP stators can be manufactured only by open-end injection of uncured elastomer into the metallic stator tube. This means that there is little pressure or force at the interface between adhesive layer and injecting elastomer. Such lack of molecular entanglement between adhesive and elastomer polymers may need to be compensated by increasing the thickness of adhesive for PDM and PCM stator products. A thicker adhesive application for PDM and PCP stators is beneficial for better intermolecular entanglement and also effectively preventing plasticizer migration to the bonding interface that results in contamination of the bonding interface during the drilling operation. However, thicker adhesive application greater than 7 mil (178 μm) does not offer such an advantage for PDM and PCP stators. Instead, adhesive application greater than 7 mil (178 μm) leads to weaker bonding due to excessive brittleness in the stator. Thinner adhesive application less than 2.5 mil (64 μm) does not offer advantage for PDM and PCP stators due to insufficient intermolecular entanglement and susceptibility to contamination of bonding interface by plasticizer in the cured elastomer compound.

Examples of the above embodiments include:

Example 1 includes a downhole motor or pump assembly that includes a housing comprising a metal; a stator secured and sealed within the housing using an adhesive system comprising an adhesive and a dried film thickness of 2.5 mil to 7 mil, the stator comprising an elastomer compound comprising an uncured plasticizer; and a rotor rotatable within the stator.

Example 2. The assembly of Example 1, wherein the dried thin film thickness of the adhesive system is selected based at least in part on the plasticizer content of the stator.

Example 3. The assembly of Example 1, wherein the elastomer compound comprises between at least 10 phr and 30 phr of total combined plasticizers.

Example 4 The assembly of Example 1, wherein the plasticizer comprises an ester-based plasticizer comprising at least one of an adipate, a sebacate, a phthalate, a trimellitate, epoxidized soybean oil (ESO), or any combination thereof.

Example 5. The assembly of Example 1, wherein the dried thin film thickness provides sufficient resistance to prevent migration of the plasticizer through the adhesive system or prevent deterioration of adhesive system.

Example 6. The assembly of Example 1, wherein the adhesive system is a one-component system comprising the adhesive.

Example 7. The assembly of Example 1, wherein the adhesive system is a two-component system comprising the adhesive and a primer.

Example 8. The assembly of Example 1, wherein the assembly is connected to and operable as a motor to power the rotation of a drill bit.

Example 9 includes a method of performing a downhole operation in a borehole, comprising operating a downhole motor or downhole pump assembly, the motor or pump comprising a housing comprising a metal; a stator secured and sealed within the housing using an adhesive system comprising an adhesive and a dried film thickness of 2.5 mil to 7 mil, the stator comprising an elastomer compound comprising an uncured plasticizer; and a rotor rotatable within the stator.

Example 10. The method of Example 9, wherein the dried thin film thickness of the adhesive system is selected based at least in part on the plasticizer content of the stator.

Example 11. The method of Example 9, wherein the elastomer compound comprises between at least 10 phr and 30 phr of total combined plasticizers.

Example 12 The method of Example 9, wherein the plasticizer comprises an ester-based plasticizer comprising at least one of an adipate, a sebacate, a phthalate, a trimellitate, epoxidized soybean oil (ESO), or any combination thereof.

Example 13. The method of Example 9, further comprising preventing migration of the plasticizer through the adhesive system.

Example 14. The method of Example 9, wherein the adhesive system is either a one-component system comprising the adhesive or a two-component system comprising the adhesive and a primer.

Example 15. The method of Example 9, wherein the downhole operation comprises drilling the borehole operating the downhole motor assembly or pumping borehole fluids operating the downhole pump assembly.

Example 16 includes a drilling assembly for drilling a borehole, comprising a drillstring comprising a downhole motor assembly operable by pumping fluid through the motor. The motor comprises a housing comprising a metal; a stator secured and sealed within the housing using an adhesive system comprising an adhesive and a dried film thickness of 2.5 mil to 7 mil, the stator comprising an elastomer compound comprising an uncured plasticizer; and a rotor rotatable within the stator. The assembly also includes a drill bit rotatable by the operation of the motor to drill the borehole.

Example 17. The assembly of Example 16, wherein the elastomer compound comprises between at least 10 phr and 30 phr of total combined plasticizers.

Example 18. The assembly of Example 16, wherein the dried thin film thickness provides sufficient resistance to prevent migration of the plasticizer through the adhesive system or prevent deterioration of adhesive system.

Example 19. The assembly of Example 16, wherein the adhesive system is a one-component system comprising the adhesive.

Example 20. The assembly of Example 16, wherein the adhesive system is a two-component system comprising the adhesive and a primer.

Certain terms are used throughout the description and claims to refer to particular features or components. As one skilled in the art will appreciate, different persons may refer to the same feature or component by different names. This document does not intend to distinguish between components or features that differ in name but not function.

For the embodiments and examples above, a non-transitory computer readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

While compositions and methods are described herein in terms of "comprising" various components or steps, the compositions and methods can also "consist essentially of" or "consist of" the various components and steps.

Unless otherwise indicated, all numbers expressing quantities are to be understood as being modified in all instances by the term "about" or "approximately". Accordingly, unless indicated to the contrary, the numerical parameters are approximations that may vary depending upon the desired properties of the present disclosure.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A downhole motor or pump assembly, the downhole motor or pump assembly comprising:
   a housing comprising a metal;
   a stator secured and sealed within the housing using an adhesive system comprising an adhesive and a dried film thickness of 2.5 mil to 7 mil, the stator comprising an elastomer compound comprising an uncured plasticizer, wherein the dried film thickness is selected based at least in part on the plasticizer content of the stator so as to prevent migration of the plasticizer through the adhesive system or prevent deterioration of the adhesive system; and
   a rotor rotatable within the stator.

2. The assembly of claim 1, wherein the elastomer compound comprises between at least 10 phr and 30 phr of total combined plasticizers.

3. The assembly of claim 1, wherein the plasticizer comprises an ester-based plasticizer comprising at least one of an adipate, a sebacate, a phthalate, a trimellitate, epoxidized soybean oil (ESO), or any combination thereof.

4. The assembly of claim 1, wherein the adhesive system is a one-component system comprising the adhesive.

5. The assembly of claim 1, wherein the adhesive system is a two-component system comprising the adhesive and a primer.

6. The assembly of claim 1, wherein the assembly is connected to and operable as a motor to power the rotation of a drill bit.

7. A method of performing a downhole operation in a borehole, comprising operating a downhole motor or downhole pump assembly, the motor or pump comprising:
   a housing comprising a metal;
   a stator secured and sealed within the housing using an adhesive system comprising an adhesive and a dried film thickness of 2.5 mil to 7 mil, the stator comprising an elastomer compound comprising an uncured plasticizer, wherein the dried film thickness is selected based at least in part on the plasticizer content of the stator so as to prevent migration of the plasticizer through the adhesive system or prevent deterioration of the adhesive system; and
   a rotor rotatable within the stator.

8. The method of claim 7, wherein the elastomer compound comprises between at least 10 phr and 30 phr of total combined plasticizers.

9. The method of claim 7, wherein the plasticizer comprises an ester-based plasticizer comprising at least one of an adipate, a sebacate, a phthalate, a trimellitate, epoxidized soybean oil (ESO), or any combination thereof.

10. The method of claim 7, wherein the adhesive system is either a one-component system comprising the adhesive or a two-component system comprising the adhesive and a primer.

11. The method of claim 7, wherein the downhole operation comprises drilling the borehole operating the downhole motor assembly or pumping borehole fluids operating the downhole pump assembly.

12. A drilling assembly for drilling a borehole, comprising:
   a drillstring comprising a downhole motor assembly operable by pumping fluid through the motor, the motor comprising:
      a housing comprising a metal;
      a stator secured and sealed within the housing using an adhesive system comprising an adhesive and a dried film thickness of 2.5 mil to 7 mil, the stator comprising an elastomer compound comprising an uncured plasticizer, wherein the dried film thickness is selected based at least in part on the plasticizer content of the stator so as to prevent migration of the plasticizer through the adhesive system or prevent deterioration of the adhesive system; and
      a rotor rotatable within the stator; and
   a drill bit rotatable by the operation of the motor to drill the borehole.

13. The assembly of claim 12, wherein the elastomer compound comprises between at least 10 phr and 30 phr of total combined plasticizers.

14. The assembly of claim 12, wherein the adhesive system is a one-component system comprising the adhesive.

15. The assembly of claim 12, wherein the adhesive system is a two-component system comprising the adhesive and a primer.

* * * * *